Dec. 28, 1926.
A. ORT
1,612,646
MACHINE FOR BEATING FURS AND OTHER SIMILAR OBJECTS
Filed Sept. 7, 1923    2 Sheets-Sheet 1
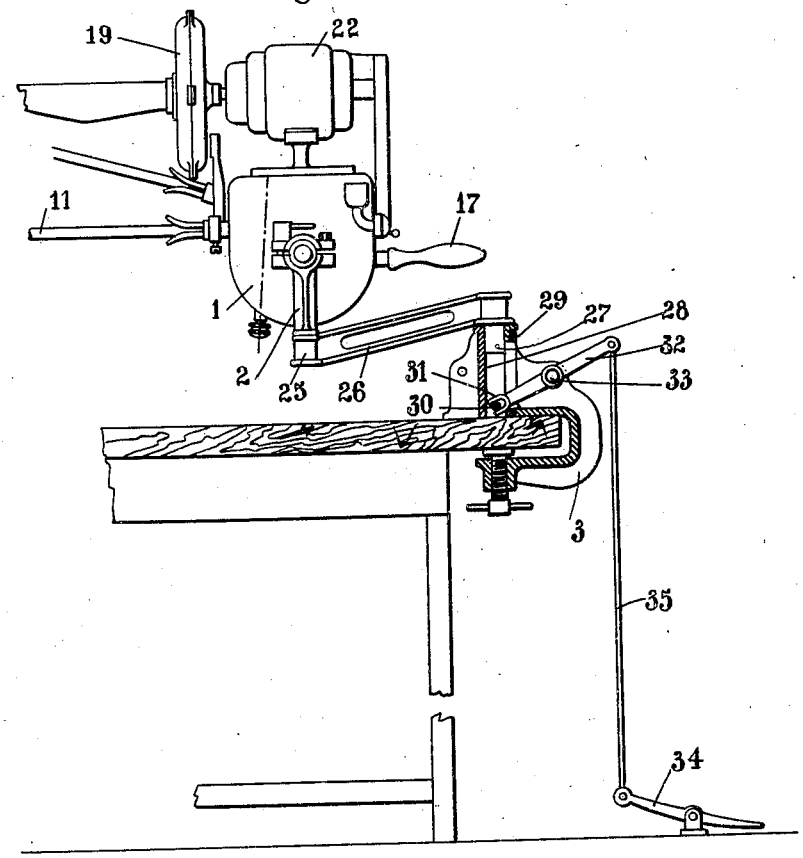
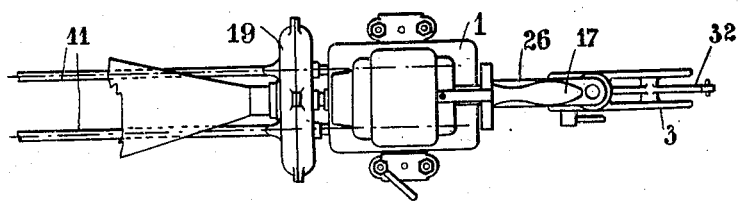

Dec. 28, 1926.

A. ORT 1,612,646

MACHINE FOR BEATING FURS AND OTHER SIMILAR OBJECTS

Filed Sept. 7, 1923      2 Sheets-Sheet 2

Patented Dec. 28, 1926.

1,612,646

UNITED STATES PATENT OFFICE.

ANTOINE ORT, OF PARIS, FRANCE.

MACHINE FOR BEATING FURS AND OTHER SIMILAR OBJECTS.

Application filed September 7, 1923, Serial No. 661,500, and in France September 14, 1922.

The present invention relates to a machine for beating furs, carpets and similar articles. This machine constitutes a movable apparatus which can be attached to any suitable table and, during its operation and at the will of the operator, it can be given two pivoting movements; one horizontal and the other vertical, thereby enabling the rods to be led to the desired portion of the object to be beaten and of striking blows of varying strength.

The invention also relates to a device which enables the field of action of a machine of this kind to be varied instantaneously and conveniently, such device consisting of a pivoted supporting arm interposed between the machine itself and the press or attaching member, by means of which it is mounted upon the table.

In order that the vertical distance between the skin or article to be beaten and the rods may be varied, the machine is furthermore provided with means actuated by a lever or pedal, by means of which the machine may be raised or lowered relative to the attaching means.

An illustrative embodiment of the invention is shown in the drawings in which Figure 1 represents a side elevation, a part thereof being shown in section.

Figure 2 is a plan view of the same.

Figure 3:
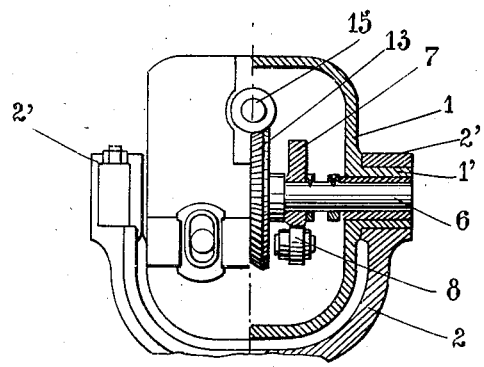
Figure 3 is an end view of the casing, one-half being shown in section.
Figure 4:
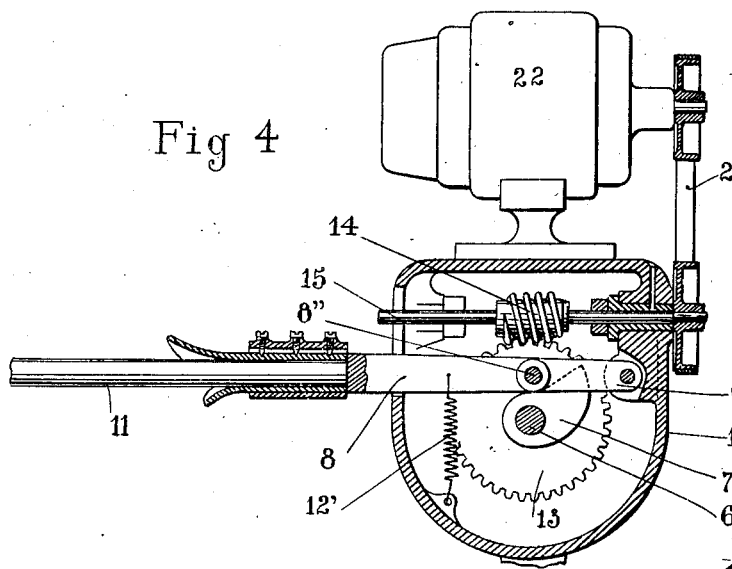
Figure 4 is a side view in section through the casing and some of its associated parts.

Referring now in detail to the several figures, the numeral 1 indicates a gear case or frame provided with lateral trunnions 1' by means of which it is mounted in bearings formed by the arms 2' of the fork-shaped support 2.

The trunnions 1' serve as bearings for a shaft 6 having cams 7, only one of which can be seen in the drawing. Each of these cams acts upon a roller 8" carried by one of the levers 8 at a point forwardly of the axis of oscillation 8' of said lever. The action of said cam is to elevate the lever 8. A spring 12' imparts movement to the lever in a direction opposite to that imparted by the cam 7.

The shaft 6 carries a helicoidal gear 13 meshing with a worm 14 fixed to a shaft 15 suitably journalled in the gear case. An electric motor 22 may be arranged in any suitable operative relation to the shaft 15, and is here shown as being mounted directly upon the gear case and connected to the shaft 15 by means of a belt or chain 23 passing over sprockets on the motor shaft and shaft 15.

Figures 1 and 2 show, on the one hand, means enabling the radius of action of the machine to be increased, and, on the other hand, making it possible to vary the distance between the machine and the object to be beaten.

In this arrangement, the fork 2 which supports the frame-gear case 1 is held in such a manner that it can pivot about a vertical trunnion (not shown) in a bearing 25 provided at one extremity of an arm or bracket 26 which latter is fitted at its other extremity with a pin 27 turning in a sleeve 28 mounted in the clamp 3.

By means of this arrangement, the operator can, without effort, direct the machine to any point of the surface to be operated on and can vary the field of action by acting upon the arm 26, whereby skins of very great surface can be beaten without it being necessary to move them about.

In order to enable the vertical distance between the machine and the article to be beaten to be varied, the sleeve 28 can be moved vertically in a tubular guide-member 29 of the clamp 3 and it is fitted internally with a pin 30 which is engaged by the forked end 31 of an actuating lever 32 pivoting about a fixed axis 33, the said forked end 31 penetrating the sleeve 28 through two registering vertical slots in the guide-member 29 and the sleeve 28 respectively. By actuating the lever 32 with one hand while holding the apparatus with the other hand by the handle 17, the operator can vary the distance between the object and the rods, thereby enabling furs of various lengths of hair to be beaten.

Instead of actuating the lever 32 by hand, it could be actuated by means of a pedal 34 connected to the lever by a rod 35.

It will be evident from the above that it is possible for the operator, without stopping the machine, to move the rods towards and away from the object to be beaten according to requirements, and by means of the pedal or by hand, and also to bring the machine to the desired points and to dispose it in any desired direction so as to beat all parts of a skin of large surface without moving this latter, all these various operations being effected without effort and rendering it possible for a single person to beat furs mechanically as was hitherto done manually.

It will be understood that the construction of the apparatus can be modified as to various details within the general scope of the invention as set forth in the following claim.

I claim—

In a machine for beating furs and the like embodying a beating device having vertically vibratory beaters and mechanism for operating them, the combination of a support having means for securing it in a fixed position, on a stationary ledge, an arm having at one end a downwardly extending pivot pin mounted in said support to swing about a vertical axis, the opposite end of said arm having means carrying the beating device, and means to act on the lower end of said pivot pin for bodily raising said arm and the beating device with respect to said support.

ANTOINE ORT.